June 24, 1930.  H. H. SAWYER  1,765,941
TRAP
Filed Oct. 18, 1927
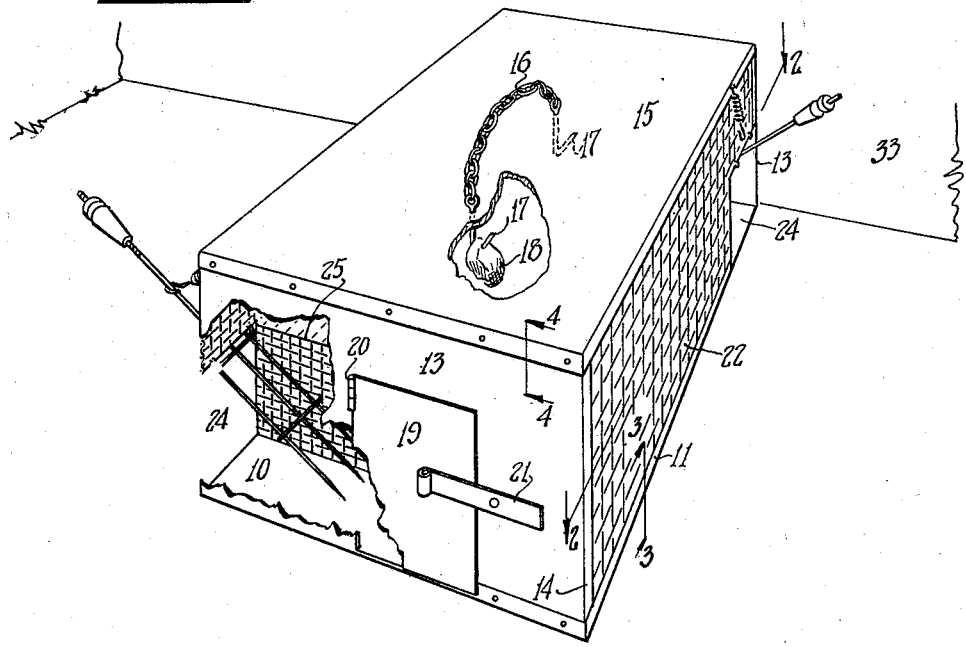
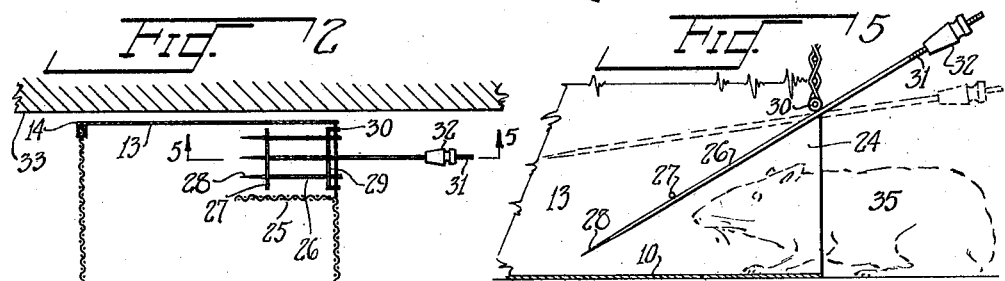
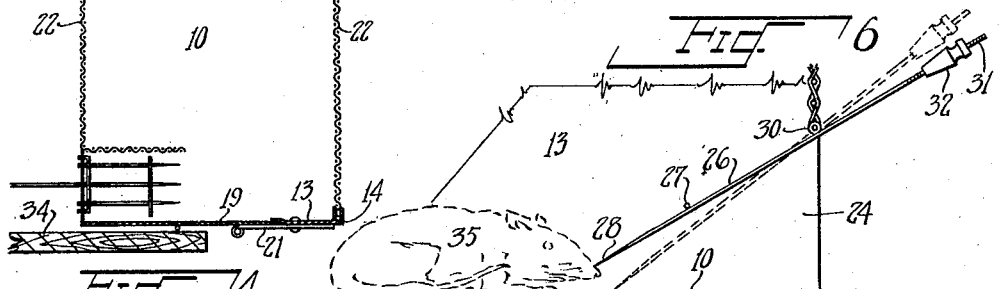
INVENTOR
H. H. Sawyer
BY E. B. Birkenbeuel.
ATTORNEY Patented June 24, 1930

1,765,941

UNITED STATES PATENT OFFICE

HOWARD H. SAWYER, OF PORTLAND, OREGON

TRAP

Application filed October 18, 1927. Serial No. 226,858.

This invention relates generally to traps, and particularly to enclosures from which the animal captured cannot escape.

The first object of this invention is to provide an exceedingly simple and efficient trap especially adapted for the capture of rats and other animals difficult to catch by ordinary trapping methods.

The second object is to produce a trap which will be capable of capturing a number of animals, and which is also self-setting and so operates that it will lend itself to the easy capture of the cleverest rodents.

The third object is to so construct the trap that it may be placed against the wall of a building in a manner to form a corner therewith, thereby placing the entrance of the trap in the natural runway of the rodents.

The fourth object is to make the trap collapsible for the purpose of facilitating its manufacture, shipment and storage, as well as reducing the tendency for damage during shipment by placing same in a small carton in a collapsed form.

The fifth object is to provide means whereby the entrance gates of the trap may be held closed against accidental opening after the capture has been made.

These, and other objects, will become more apparent from the specification following as illustrated in the accompanying drawing.

Figure 1 is a perspective view of the trap with portions broken away to show the trap door and the bait hook. Figure 2 is a horizontal section taken along the line 2—2 in Figure 1. Also showing the manner of setting the trap with relation to a wall and guiding board. Figure 3 is a vertical section taken along the line 3—3 in Figure 1. Figure 4 is a vertical section taken along the line 4—4 in Figure 1. Figure 5 is a vertical section through the trap showing the rodent entering same. Figure 6 is similar to Figure 5 but showing the rodent within the trap endeavoring to make its escape.

Similar numbers of reference refer to similar parts throughout the several views.

Referring in detail to the drawing, the trap consists of a floor 10 whose edges 11 are inturned and then upturned to form a lip 12. The ends 13 also have their edges 14 inturned. The top 15 is exactly the same as the bottom 10, except that it is provided with a chain handle 16 whose end hooks 17 pass through the top 15 and are utilized as a means for fastening the bait 18.

One end 13 is provided with a door 19 which is provided with hinges 20 and a latch 21. The sides 22 are preferably wire cloth whose edges are held between the inturned portions 11 and 12 and the inturned edges 14. Stove bolts 23 pass through the edges 11 and the ends 13 and are all that is required to assemble the trap.

Each side 22 is provided at one end with a door 24 which forms an entrance to the trap. It is preferable to make the doors 24 diametrically opposite. In order to form the doors 24 the cloth is cut along its upper edge and inturned to form a wall 25 making a small hallway into the trap. In this hallway is placed an inclined swinging door consisting of the bars 26 which are joined by the cross bars 27 and pointed at their lower ends 28. To the upper end of the bars 26 is secured a second cross bar 29 provided with ears 30 which engage the top side of the door opening 24 and form a hinge therewith. The central member 26 is provided with an outwardly extending threaded end 31 on which is placed a weight 32 by means of which the position of the trap door can be easily governed.

In practice, it is preferable to set one end of the trap, namely a closed end 13, against the wall 33 and to place a board 34 against the other side of the trap so that a rodent following the wall looking for an opening will be easily guided into the trap itself.

In operation the rodent 35 follows a wall 33 until he comes to the entrance 24 where he finds it an easy matter to push the trap door out of the way enabling him to reach the bait 18. However, when he tries to return he first touches the points 28 of the door and every effort exerted by him toward escaping moves these points downwardly, bearing with it his nose, and effectively preventing his escape.

It can be seen that by this construction the trap is exceedingly easy to bait. It need never be re-set since it is automatic in this regard and all that is necessary is to dispose of the rodents as they are captured.

I am aware that traps have long been constructed; I therefore do not intend to cover such devices broadly, but I do intend to cover all such forms and modifications thereof as fall fairly within the appended claim.

I claim:

A rat trap consisting of a floor, a top member having channels formed around the edges thereof, end members of sheet metal occupying said channels and themselves having inturned channels formed along their edges, sides between the ends, the side members consisting of wire cloth occupying said channels and having diagonally opposite inlet openings, the material from said openings turning inwardly to form a partition providing a hallway between it and the adjacent end member, grated doors within said hallway hinged at the top of said opening and sloping downwardly and inwardly almost to the bottom of said trap.

HOWARD H. SAWYER.